United States Patent [19]
Johnson et al.

[11] 3,815,114
[45] June 4, 1974

[54] MULTI-CHANNEL COMBUSTIBLE GAS DETECTOR

[76] Inventors: Robert H. Johnson, 24266 Larkwood, El Toro, Calif. 92630; Melvin C. Phillips, 11692 Eudora Ln., Garden Grove, Calif. 92640

[22] Filed: Oct. 12, 1972

[21] Appl. No.: 297,054

[52] U.S. Cl. ............... 340/237 R, 340/409, 340/414
[51] Int. Cl. .......................................... G08b 23/00
[58] Field of Search ................. 340/237 R, 409, 414

[56] References Cited
UNITED STATES PATENTS

| | | | |
|---|---|---|---|
| 2,780,671 | 2/1957 | Thery | 340/409 |
| 2,799,848 | 7/1957 | Glantz | 240/409 |
| 2,800,644 | 7/1957 | Hines | 340/409 |
| 3,662,112 | 5/1972 | Martin | 340/409 |
| 3,678,513 | 7/1972 | Ward | 340/237 R |

*Primary Examiner*—Thomas B. Habecker
*Attorney, Agent, or Firm*—Lyon and Lyon

[57] ABSTRACT

A system for detecting the presence of combustible gases employing remotely located sensors to provide separate output signals indicative of the gaseous environment at each sensor, the signals being first conditioned and then fed to a channel selection network which causes an output of only the one channel whose signal is the greatest, the output thereof being coupled to indicator devices for indicating high and low levels and for triggering appropriate alarm devices. The system has the ability to disable one channel in the event of any failure therein so as to prevent false alarms and to permit continued function of the system on the operative channel.

12 Claims, 5 Drawing Figures

MULTI-CHANNEL COMBUSTIBLE GAS DETECTOR

BACKGROUND OF THE INVENTION

Gas detecting devices of the general type of the present invention find as one of their principal applications to provide a means of giving an early warning of a hazardous gas condition and are frequently used to detect the presence of explosive mixtures of combustible gases or liquid vapors and air in conjunction with many kinds of industrial, manufacturing and/or mining operations. In such installations, sensors are mounted at a point where the introduction of a hazardous gas will be most likely to occur first, which point is ordinarily remote from the position of a machinery operator or the associated electronic unit. Industrial and mining machinery is often subject to severe vibration and shock conditions and the typical sensors used for gas detection are quite sensitive to such severe conditions so that inoperability of gas detectors due to sensor failure is a frequent problem. Gas detectors presently known employ either a single channel or two channels. Where single channel detectors are used, the frequent failure of the sensors or, for that matter, any of the intermediate portions of the system often necessitate frequent work stoppages.

Double channel systems have been available heretofore and they provide some degree of redundancy. Such units sum the outputs of the two channels, which has the advantage of continuing to provide some meaningful information even though a failure has occurred in one of the channels. The difficulty, of course, is that an output from such a summing system is meaningless in terms of the actual degree of concentration. In other words, gas concentration readings are customarily given in terms of a percentage of the lower explosive limit (LEL), and if the output from such a system provides a 100 percent reading, for example, it is not known whether one of the sensors detects 100 percent of the LEL or both of them detect a 50 percent LEL. The result is that a specific percentage of LEL cannot be detected with such a system with any reasonable degree of reliability. Furthermore, where the outputs of two channels are summed, errors due to electrical noise and temperature drift are multiplied.

SUMMARY OF THE INVENTION

The present invention provides a multi-channel gas detector providing two or more remotely located sensors for the required redundancy yet provides a means for looking only at one channel indicative of the worst condition so that an actual measurement of the maximum concentration of the gas can be made. The output of each channel is fed to a selector network which looks at both signals and selects the one having the greatest magnitude, providing an analog readout and, by using a multi-level threshold detector, provides outputs to indicate preset minimum and maximum levels of gas concentration. The system also includes means for indicating whether or not one of the channels has become inoperative, but in the event of a failure in less than all the channels, the system continues to function on the remaining operative channel or channels. The system also indicates the condition when there is a failure in all channels and in such event provides control means for automatically shutting down related equipment.

Set forth herein are two particular embodiments, generally similar, but each capable of slightly different applications. In the first embodiment, the sensor signals are compared by a comparator, the output of which controls switches coupled in the amplified outputs of each channel to exclude the unwanted signal. In the second embodiment channel selection is accomplished by unidirectional unity gain voltage followers having an ideal diode characteristic which by back biasing couples only the greater signal to the output junction.

It is a principal object, therefore, of the present invention to provide an improved gas detector for use with various industrial systems having sufficient redundancy to obviate the shutdown of the system in the event of failure in one of the sensor channels.

It is also an object of the present invention to provide a multi-channel gas detector system capable of indicating the existence of preselected gas concentration levels while at the same time providing an analog read out of the worst gas concentration of the two sensor locations.

These and other objects of the present invention will become readily apparent upon reading the ensuing detailed description in conjunction with the accompanying drawings.

DESCRIPTION OF THE INVENTION

Figure 1:
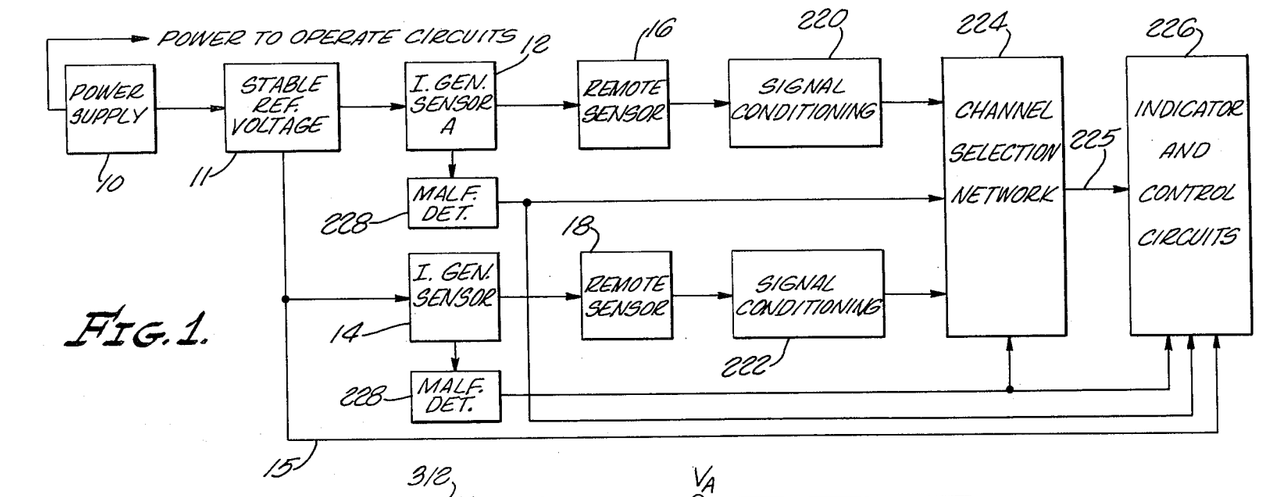
FIG. 1 is a functional block diagram of the invention showing the basic operational functions of the system.

Referring first to FIG. 1, the invention essentially comprises a two channel system, although more channels are possible. A power supply 10 is coupled to a voltage regulator 11 which supplies stable reference voltages to two separate constant current generators, one for channel A marked 12, and the other for channel B, marked 14. Regulator 11 also supplies a stable reference voltage for the indicator circuits through conductor 15. Constant current generators 12 and 14 are coupled to remote sensors 16 and 18 respectively. Each sensor is conventional in design, being of the type employing a bridge circuit having an active resistance element which has been catalytically treated so that a combustible gas-air mixture will oxidize on it causing an increase in temperature and thus a greater change in resistance value. The outputs from each sensor are fed to separate signal conditioning systems 220 and 222 respectively which include amplification and means for balancing the bridge circuits for zero.

Channel A and B signals are fed from conditioning systems 220 and 222 to a channel selection network 224 which looks at both signals and causes the signal having the greatest magnitude to appear at the output 225. The output signal at 225 is then coupled to indicator and control circuits 226 which provide readouts indicative of high and/or low levels of gas concentrations, and provide control signals by which various alarms and shutoff relays may be actuated to notify workers of a potentially hazardous gas condition and to automatically shutdown equipment working in the area. Malfunction detectors 228 are coupled to the constant current generators 12 and 14 providing outputs to the channel selectors 224 and the indicator and control circuits 226. In case of a failure in one channel, selector 224 will cause the signal of the operative channel to appear at the output 225 and the malfunction detector will produce an output indication telling which channel has malfunctioned. Occurrence of failure in both channels will drive the indicator and control circuits to give an alarm signal and to actuate an equipment shutdown function, as will be more explicitly described in following detailed explanations of the preferred embodiments.

DESCRIPTION OF THE FIRST EMBODIMENT

Figure 2:
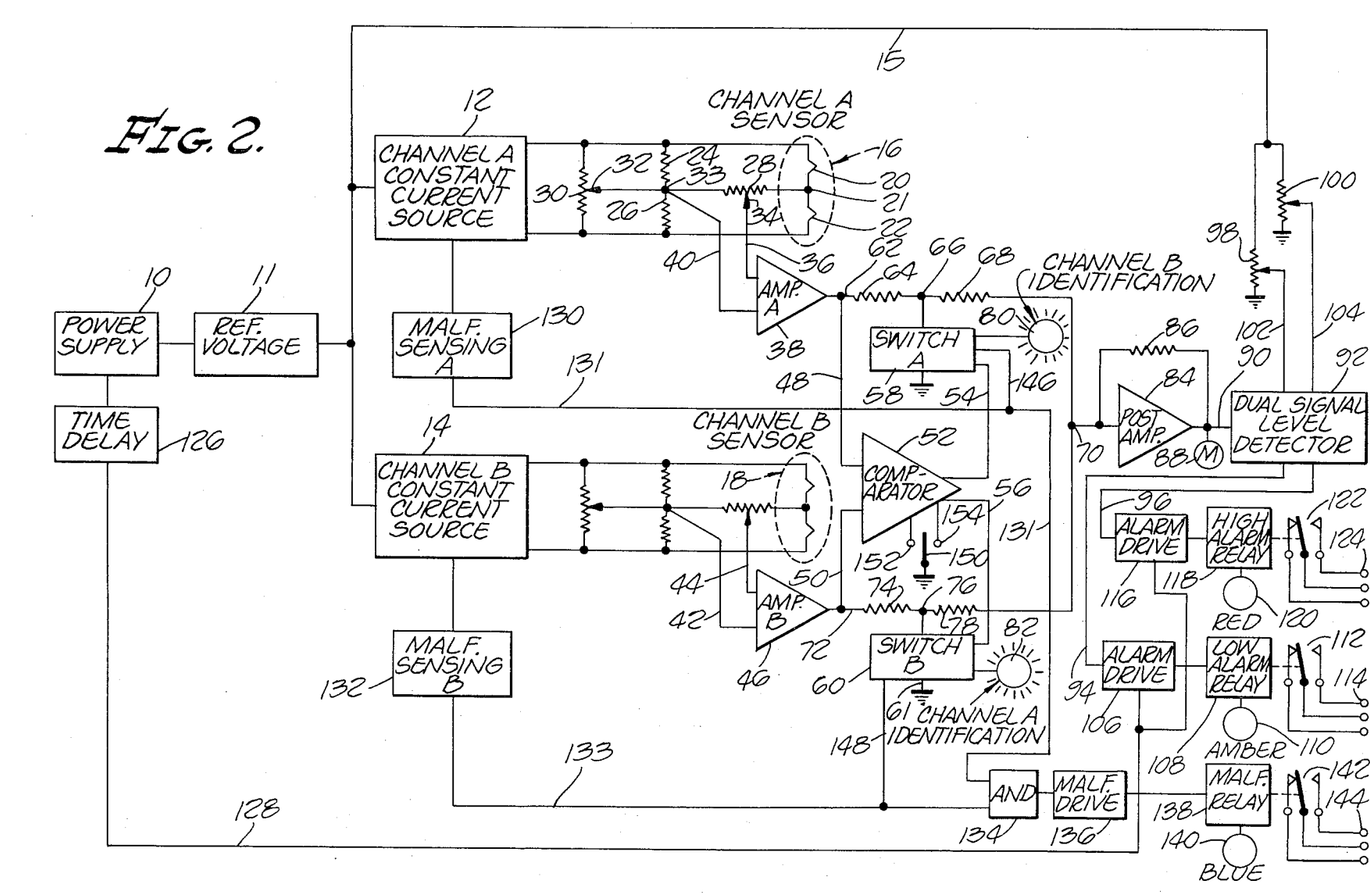
FIG. 2 is a schematic circuit diagram of the first embodiment of the gas detector using a comparator for channel selection.

If FIG. 2, as in FIG. 1, electrical power is provided by a power supply 10 through voltage regulator 11 to two separate constant current sources, one for channel A, marked 12 and the second for channel B, marked 14. Regulator 11 provides a regulated, stable, temperature compensated reference voltage to maintain a constant current from sources 12 and 14 and to establish stable reference values for the level detector through conductor 15. Constant current is independently supplied by sources 12 and 14 to remote sensors 16 and 18. Each of the sensors used herein in conventional in design and the circuits coupled thereto are alike and the ensuing description will deal only with the channel A sensor 16 and its associated circuitry with the understanding that the same description will apply to the channel B sensor. Sensor 16 includes an active resistance element 20 and a reference resistance element 22. The reference element 22 does not respond to changes in the gas composition but does compensate for ambient temperature changes, humidity changes and the like. Two other resistors 24 and 26 are coupled across sensor 16 thereby forming a Wheatstone bridge. Coupled to junction 21 between sensor elements 20 and 22 is a variable resistor 28, the other side of which is coupled to junction 33 between resistors 24 and 26. Also coupled across resistors 24 and 26 is a variable resistor 30. The wiper arm 32 of resistor 30 is coupled to junction point 33 between resistors 24 and 26. The wiper arm 34 of resistor 28 is coupled through line 36 to one input of a differential amplifier 38, the other input of which is coupled through line 40 to junction point 33. This bridge circuit for each channel thus provides a reference output on line 40 and a variable output on line 36 to the differential amplifier. Similarly, the channel B sensor 18 through its bridge circuit provides a reference output on line 42 and a variable output on line 44 as inputs to differential amplifier 46 of channel B. The purpose and function of the variable resistors 30 and 28 will be discussed subsequently.

The outputs from the Channel A and channel B amplifiers 38, 46 are coupled through lines 48 and 50 to the input of comparator 52. The output from amplifier 38 is also conducted on line 62 through series resistor 64 to junction point 66, then through series resistor 68 to junction point 70. Similarly, the output from amplifier 46 is conducted on line 72, through series resistor 74 to junction point 76, then through series resistor 78 to junction point 70. Switch 58 is coupled to junction point 66 and switch 60 is coupled to junction point 76. The function of the comparator 52 is to examine the output levels of each of the channel A and channel B amplifiers and to select the signal of the greatest magnitude. Upon comparing the outputs comparator 52 provides control signals on lines 54 and 56 which are coupled to switches 58 and 60. If the output from amplifier 38, for example, is greater the comparator will produce control signals to actuate switch 60 and retain switch 58 in the off condition. When switch 60 is actuated, the output from amplifier 46 is essentially coupled to ground at 61. Obviously, the converse condition occurs should the output from amplifier 46 be greater. Channel identification indicators 80 and 82 are coupled to the switches 58 and 60 respectively. Under the foregoing exemplary conditions, if switch B is actuated, indicator 82 will receive an output from switch 60 illuminating identifier 82 which is appropriately indexed to indicate that channel A is providing the output to summing junction 70. Summing junction 70 is coupled to the input of an amplifier 84, which is provided with a feedback resistor 86 between the output and the input thereof. A meter 88 is coupled to the output of amplifier 84 to provide an analog indication of the output signal from the sensor channel selected by comparator 52.

Amplifier 84, resistors 64, 68, 74, 78 and feedback resistor 86 are coupled to form an operational amplifier circuit. Resistors 64 and 68 in series comprise the input resistance for the output signal from amplifier 38 and, likewise, series resistors 74 and 78 for amplifier 46. In this configuration, the outputs from the channel amplifiers are coupled in a summing configuration to junction 70 but the switches 58 and 60 controlled by the comparator 52 defeat summing of the outputs of the two amplifiers by effectively grounding one of them so that under normal operating conditions (absence of any malfunction in one of the channels) the switches are effective in permitting only one channel output appearing at the input to amplifier 84. In the case of a malfunction, as will be more fully described subsequently, the switches can also be effective in grounding both amplifier inputs.

Meter 88 is calibrated to read in terms of a percentage of the lower explosive limit (LEL) of a given gas so that at full scale the meter would read 100 percent of LEL. The output from amplifier 84 is conducted on line 90 to a dual signal level detector 92. Level detector 92 provides two outputs, on lines 94 and 96 respectively. A reference voltage derived from the voltage regulator 11 through conductor 15 is supplied to variable resistors 98 and 100, then through lines 102 and 104 to the level detector 92. By adjusting the variable resistors 98 and 100, the thresholds of detector 92 can be adjusted according to preselected minimum and maximum acceptable levels of the LEL.

The output from detector 92 on line 94 is conducted to an alarm drive 106 in response to the condition where the input signal to the detector 92 reaches the preselected minimum value established by potentiometer 98. The output of the alarm drive 106 is conducted to the low alarm relay 108, closure of which illuminates an appropriate indicator 110 preferably to provide visual illumination and also actuates external contacts 112 coupled to external terminals 114 to which may be connected any type of desired alarm device or remote indicator.

Similarly, when the input signal to detector 92 reaches the level established by potentiometer 100, preferably set an established maximum acceptable value of LEL, the signal on line 96 is conducted to an alarm drive 116 the output of which is coupled to a high alarm relay 118, the closure of which similarly actuates a visual indicator 120. External relay contacts 122 are also provided for coupling to external terminals 124 for connection to an alarm or remote indicator.

A time delay circuit 126 is connected to power supply 10 providing an output on line 128 conducted to the alarm drives 106 and 116. When power is first applied to the unit, time delay 126 will temporarily disable the alarm drives 106 and 116 for a period of time sufficient to permit the remainder of the system to stabilize. Particularly in instances where the external contacts 114 and 124 are coupled not only to alarm systems but also to systems capable of shutting down machinery to which the present device might be coupled, it is important to prevent any false alarms or unnecessary shutdowns. By disabling the alarm drives until the circuit stabilizes, the time delay is effective in preventing any alarms which could occur in response to false signals emanating in the system during stabilization.

Current sensing means 130 and 132 are connected to constant current sources 12 and 14 respectively to produce an output if current through the remote sensor or its associated cable is interrupted for any reason. The output of current sensor 130 is conducted on line 131 to AND circuit 134. Similarly, the output of current sensor 132 is conducted on line 133 to AND circuit 134. The output of AND circuit 134 is coupled to malfunction drive circuit 136, the output of which is in turn coupled to malfunction relay 138, which actuates a visual indicator such as a lamp 140 and also has coupled therewith external contacts 142 with external terminals 144 which may be coupled to appropriate alarm and indicator devices. In this manner, malfunction relay 138 is normally closed providing no read out as long as channels A and B are functioning, and therefore as long as there are signals on lines 131, 132 to the AND circuit. If there is any failure in either one or both of the remote sensors the AND circuit 134 provides no signal to relay drive 136, thereby opening relay 138 and giving a read out. In addition, conductor 133 is coupled through line 148 to switch 60. Hence, if there is a malfunction in channel A, a signal through line 146 will actuate switch 58 to zero the output of amplifier 38. By so doing, comparator 52 will react by opening switch 60 to conduct the channel B signal to summing junction 70.

Calibration of the bridge circuits of each sensor is readily accomplished through means of variable resistors 30 and 28. To accomplish this, it is first necessary to assure that the output signal to meter 88 is either the channel A or B signal. This is accomplished by means of the manual channel select switch 150 which overrides the automatic select function of comparator 52 when switch 150 is moved from its neutral position into contact with either terminal 152 or 154. Assuming that movement of switch 150 to terminal 152 causes comparator 52 to select the channel A signal, meter 88 will indicate the signal produced by sensor 16. With sensor 16 in clean air, zeroing potentiometer 30 may then be adjusted until meter 88 is zeroed. Then the sensing element is exposed to a standard calibration gas having a known percentage composition and the span potentiometer 28 is adjusted to give a reading on meter 88 corresponding to the known percentage of LEL for the calibration gas. In making this adjustment it is not necessary to retain the manual selector switch 150 in its closed position as long as the sensor for the other channel is not exposed to a high gas concentration. The same procedure is then followed for the channel B sensor. To adjust the levels at which the high and low alarms will be actuated, the zeroing potentiometer 30 of either channel is advanced until meter 88 reads the desired percentage LEL value at which the low alarm is to be actuated, usually about 35 percent. Potentiometer 98 is then adjusted until the low alarm relay 108 is triggered. Then potentiometer 30 is again adjusted until the meter reads its high value, and then potentiometer 100 is adjusted until the high alarm relay 118 is triggered. The zeroing potentiometer 30 is then returned to provide a zero indication on the meter.

After power has been switched onto the unit and the time established by the time delay 126 has expired, malfunction relay 138 will be actuated if current to either of the sensors has been disrupted. If the malfunction relay is actuated and both channel identifiers 80 and 82 are illuminated, it indicates that both switches 58 and 60 have been closed thereby indicating a malfunction in both channels.

DESCRIPTION OF THE SECOND EMBODIMENT

Figure 3:
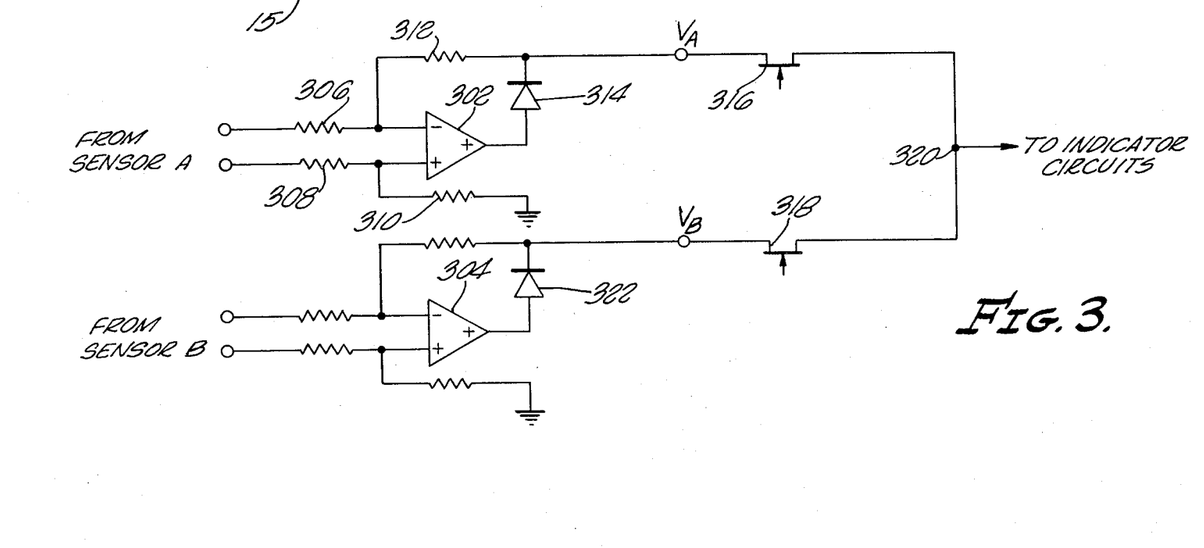
FIG. 3 is a partial schematic diagram of the ideal diode channel selector of the second embodiment.
Figure 4A:
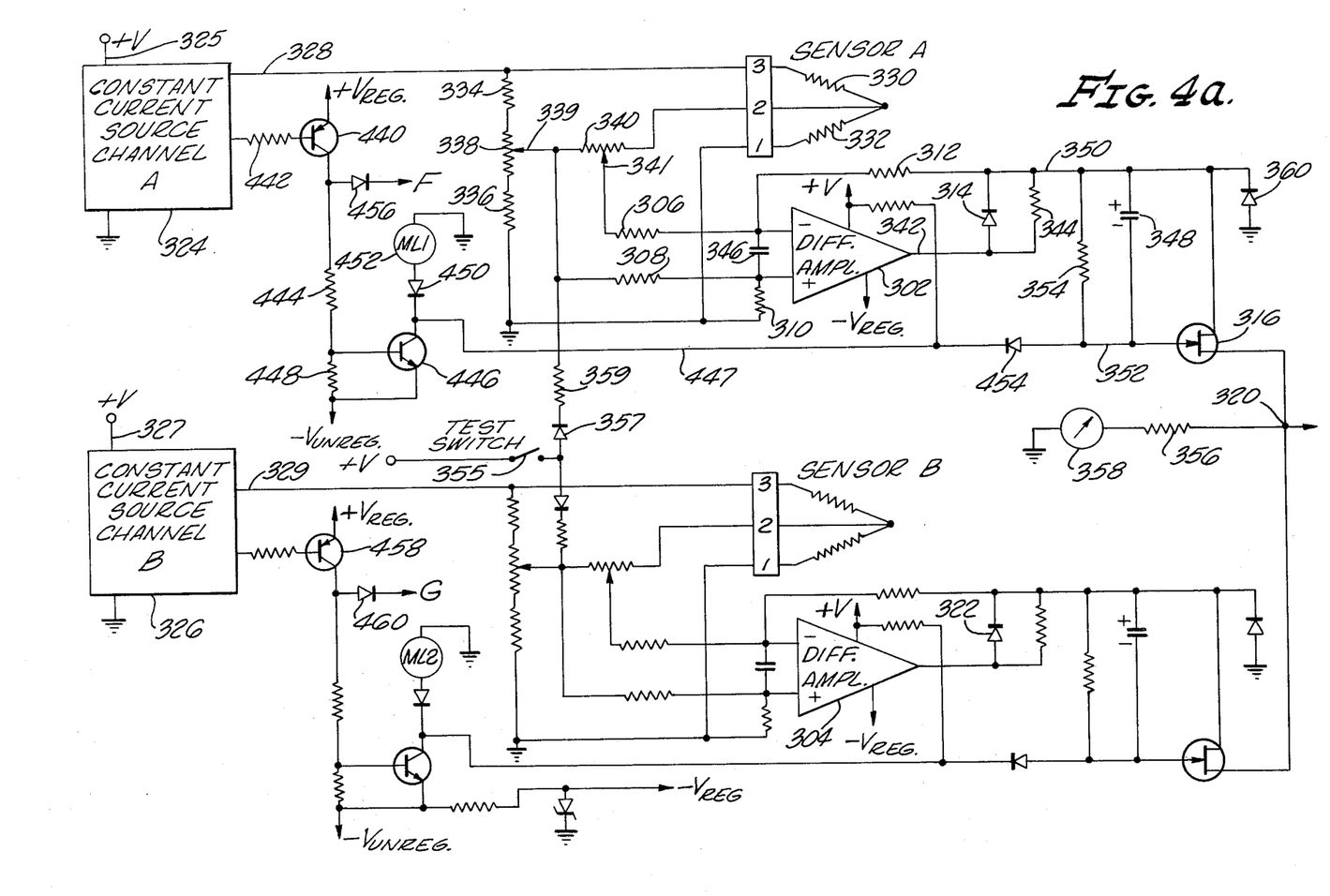
FIG. 4a and 4b is a complete schematic circuit diagram of the second embodiment.
Figure 4B:
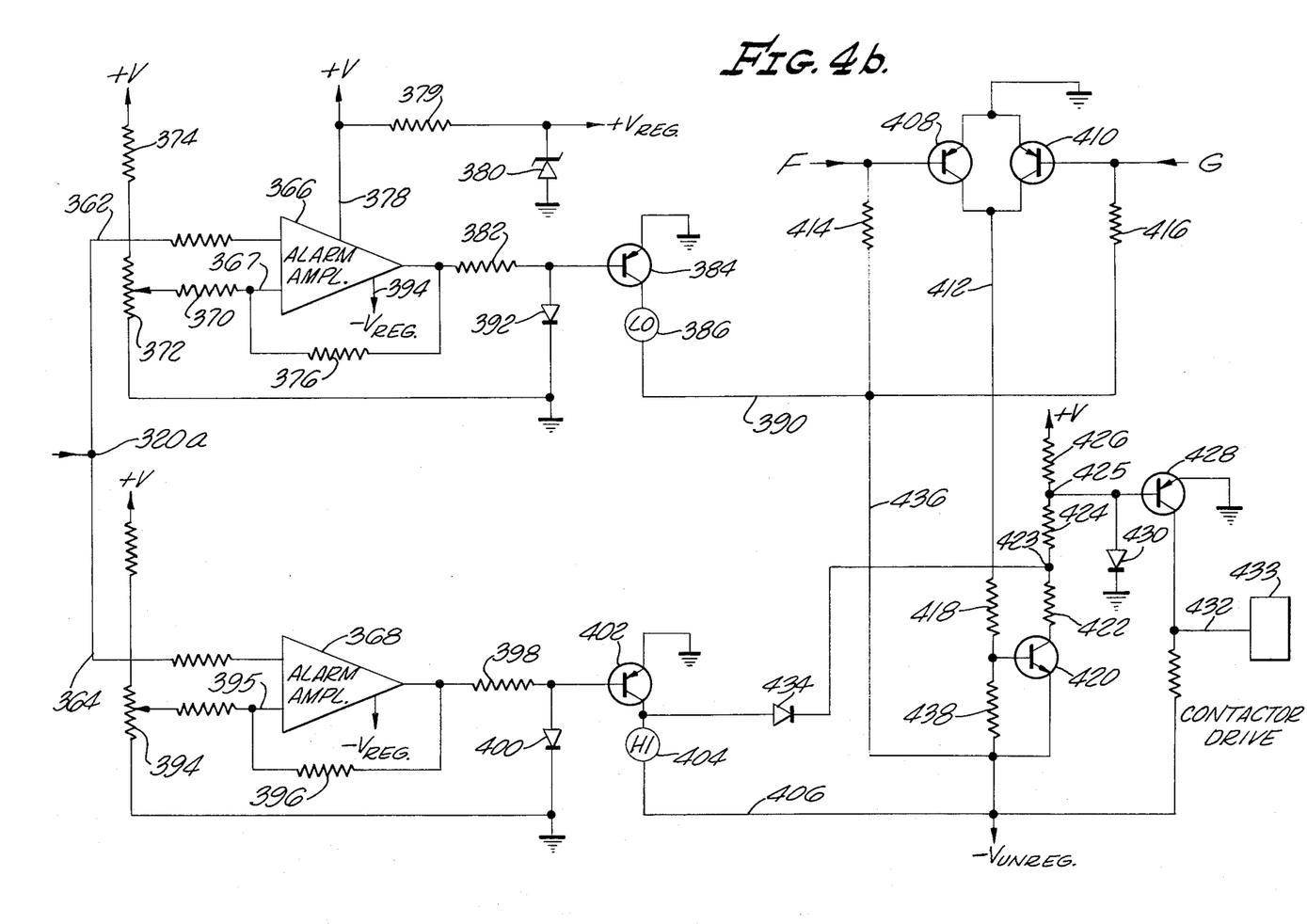

Turning now to FIGS. 3 and 4, the second or alternate embodiment of the present invention employs a somewhat different mode of channel selection, although still performing the function of selecting only the signal which is the highest. The first embodiment is, however, limited by the capabilities of the comparator as to how many sensor channels can be accommodated, whereas the second embodiment has the capability of accommodating two or more channels while always providing an output which represents the worst gas concentration condition. This provides a gas detector capable of having sensors at a multitude of locations rather than merely providing a back up or redundant system. Although the first embodiment can place sensors at separate locations, for most uses the back up redundance is an important aspect.

For channel selection, the second embodiment employs unidirectional unity gain voltage followers having an electronically generated ideal diode characteristic. The outputs of each channel are coupled to a common junction so that the output signal having the greatest magnitude back biases the diode or diodes of the other channels producing a unique voltage output signal in terms of the greatest signal value which is in turn fed to the indicator and control circuits.

In FIG. 3, differential amplifier 302 receives plus and minus inputs from the remote sensor of channel A. The operation of amplifier 304 is similar deriving its inputs from the channel B sensor. The combination of resistors 306, 308 and 310 and feedback resistor 312 form part of the signal conditioning as the networks 220, 222 of FIG. 1 so that zero and span may be adjusted. The combination of resistors 306 and 312 together with amplifier 302 and diode 314 comprise the voltage follower having an ideal diode characteristic. The function of the field effect transistors (FET) 316 and 318 will be described subsequently, suffice it to say at this point that if amplifiers 302 and 304 are providing outputs and no malfunctions have occurred, the FETs are of no effect. Thus, if $V_A$ is greater than $V_B$, voltage at junction 320 will equal $V_A$ because diode 322 will be back biased by $V_A$ and therefore nonconductive. The complete operation of this variation and its advantages will be readily apparent from FIG. 4.

In FIG. 4a, as before, regulated constant current sources 324 and 326 coupled to a power source at terminals 325, 327 respectively provide outputs at terminals 328 and 329. The circuits for channels A and B are identical and an explanation of one will suffice. The output of source 324 at 328 is coupled to remote sensor A comprising active resistance 330 and passive resistance 332. These two resistors together with resistors 334 and 336 coupled in series with variable resistor 338 make up the balance of a Wheatstone bridge circuit. Variable resistor 338 provides as zero adjustment similar to resistor 30 of FIG. 2. Variable resistor 340 is coupled between resistors 330 and 332 and to the wiper arm 339 of resistor 338. The wiper arm 341 of resistor 340 is coupled through series resistor 306 to the input of differential amplifier 302. The wiper arm 339 of resistor 338 is coupled through series resistor 308 to the other input of amplifier 302. Resistor 310 is coupled between the positive input terminal of 302 and ground potential and with one side of resistor 332. The output terminal 342 of amplifier 302 is coupled to diode 314 having the polarity shown coupling through feedback resistor 312 to the minus input of amplifier 302. A bypass resistor 344 is coupled across diode 314 to provide a leakage path so that the output voltage which will ultimately appear at junction 320 can go below zero for calibration purposes. There is a capacitor 346 coupled across the inputs to amplifier 302 which acts as a low pass filter cutting out the high speed transients of outside interference. Similarly, capacitor 348 is coupled between line 350 which is coupled to the output of the amplifier through diode 314 and the other side of capacitor 348 is coupled to line 352 and this capacitor again is for the purpose of eliminating high speed transients, the response time being established by the value of resistor 354 coupled there across. Output line 350 is coupled to one of the terminals of FET 316, the other terminal of which is coupled to junction point 320. Junction point 320 to which is also coupled the other terminal of FET 318 of the channel B circuit, is likewise coupled through a series resistor 356 and then to a meter 358, the other side of which is coupled to ground potential. A diode 360 is coupled between line 350 and ground potential. This diode is for the purpose of protecting FET 316. If there is a maladjustment of the calibration potentiometers 340 or 338, or a failure in the sensor circuit, amplifier 302 could provide a large negative output signal so the combination of diode 360 and resistor 354 give a combination which clamps the negative value which will appear at junction 320 to a slightly negative value, enough to protect the FET but sufficiently negative so that meter 358 can pass below zero for calibration purposes. A test switch 355 having one terminal coupled to a positive potential source, is coupled through diode 357 and series resistor 359 to wiper arm 339 of the bridge circuit. Closure of switch 355 applies positive voltage to one side of each bridge circuit causing unbalance so that each amplifier produces an output in excess of the high alarm level thereby simulating a condition which triggers appropriate alarm devices.

Turning now to FIG. 4b, junction 320 couples to junction 320a, from which the signal is conducted on two lines coupled to that junction, line 362 extending to the input of differential amplifier 366 and line 364 extending to the input of differential amplifier 368. The other input to amplifier 366 is coupled through series resistor 370 to variable resistor 372, then through another series resistor 374 to a positive D.C. potential. A feedback resistor 376 is coupled between the output of amplifier 366 and the reference input 367. In this manner, amplifier 366 functions as a threshold detector providing an output when the signal on line 362 exceeds the signal at input 367, and that threshold is established by adjustment of the variable potentiometer 372. In this configuration, amplifier 366 is established to provide a low alarm or threshold indication. Line 378 to amplifier 366 merely provides positive D.C. potential, and through resistor 379 and Zener Diode 380, also provides a source of regulated positive potential for use elsewhere in the circuit. The output of amplifier 366 is coupled through series resistor 382 to the base of transistor 384, the emitter of which is coupled to ground and the collector of which is coupled in series with an indicator lamp 386 connected to the source of negative unregulated voltage through lines 390 and 436. A diode 392 is coupled between the base of transistor 384 and ground potential. Normally, where no alarm levels have been reached and no malfunctions have occurred, the output of amplifier 366 represents a large positive voltage and thus transistor 384 would see a large base to emitter potential which could cause reverse breakdown of that transistor. Diode 392 clamps the output of amplifier 366 to a relatively small positive voltage so as to protect transistor 384. When an alarm level has been exceeded as established by the regulated negative voltage supply at 394, the potential across diode 392 back biases the diode and thus the base of transistor 384 goes negative causing the transistor to conduct through the series lamp 386 thereby illuminating it to provide a visual indication that the preselected low alarm level has been exceeded.

Amplifier 368 is connected in a smilar manner deriving its variable input through line 364 and its reference input through potentiometer 394 to input 395. This amplifier is also provided with a feedback resistor 396 and a series output resistor 398 with diode 400 coupled between the output and ground. Diode 400 functions similarly to diode 392 to protect transistor 402 which has its base coupled to the output of amplifier 368, the emitter connected to ground and the collector connected through a series coupled lamp 404 to the source of negative unregulated voltage through line 406.

Transistors 408 and 410 are coupled in parallel with their emitters and collectors connected together, the emitters being coupled to ground potential and the collectors providing an output signal on line 412. The bases of transistors 408 and 410 are coupled through resistors 414 and 416 respectively to line 390. The output line paired from the paired. transistors is coupled through resistor 418 to the base of transistor 420, the emitter of which is coupled to the source of negative voltage and the collector of which is coupled through the series resistors 422, 424 and 426 to a positive potential source, the series resistors providing proper bias for the collector and also providing bias for the base of transistor 428 which is coupled to junction 425 between resistors 424 and 426. Diode 430 coupled between the base of transistor 428 and ground potential protects transistor 428 by limiting the positive voltage at the base so as not to cause reverse breakdown. The output of transistor 428 from the collector thereof provides an output signal at line 432 to contactor drive 433 which comprises one or more relays or the like used to control machinery to which this gas detector may be connected so that in the event alarm levels are exceeded or in the event of malfunctions in all channels, a signal can be derived to shut off the equipment. Diode 434 is coupled between the collector of transistor 402 to junction 423 between resistors 422 and 424.

During normal operation, transistors 408 and 410 will both be conducting providing an output signal on line 412 to the base of transistor 420 so that transistor 420 is likewise conducting, as is transistor 428. When transistor 428 is conducting, the voltage across diode 430 is slightly negative. Where the high alarm value established by potentiometer 394 has not been exceeded, transistor 402 is not conducting and therefore diode 434 is back biased. The collector of transistor 420 is substantially at a voltage level equal to the negative unregulated voltage source so that at junction 423, the voltage is somewhere between the slightly negative value across diode 430 and the negative potential source, thereby back biasing diode 434. If the input signal from line 364 to amplifier 368 exceeds the input signal of 395, so that the high alarm level is exceeded, transistor 402 is turned on and the voltage at the collector thereof goes essentially to ground from a minus potential and thereby the voltage at the collector will exceed the voltage at junction 423 so that diode 434 is thereby forward biased tending to pull up the voltage level at junction 423 and therefore the voltage at junction 425 so as to shut off transistor 428, interrupting the output signal on line 432 to shut off the contactor drive.

Returning now to FIG. 4a, the malfunction detecting portion of the circuit consists of transistor 440, the base of which is coupled through resistor 442 to the constant current source 324. The collector of transistor 440 is coupled through series resistor 444 to the base of transistor 446, resistor 448 being coupled between the base and the emitter and in turn is coupled to the source of negative potential. The collector of transistor 446 is coupled through a series diode 450, through a series lamp 452 to ground potential. The collector of transistor 446 is coupled through line 447, diode 454 and line 352 to the gate electrode of FET 316. Thus, in the event of a malfunction in sensor A, when transistor 446 turns on, the collector approaches a voltage level close to the minus voltage source thereby turning off FET 316. When this happens, voltage output from amplifier 302 is interrupted to the junction 320 so that any output from channel A is effectively removed from the circuit but the gas detector can continue to operate fully on channel B or any other additional channels which may be used. It can also continue to function to detect high and low level alarm signals as previously described. Indicator lamp 452 will provide visual indication of this malfunction and will also indicate in what channel it has occurred. Similarly, when transistor 440 is caused to conduct in response to a malfunction, the output signal at terminal F to the base of transistor 408 will turn off transistor 408 so that that transistor will not continue to provide bias for transistor 420. However, transistor 410 will continue to conduct so that transistor 420 will likewise still be on. In the event that malfunctions occur in both channels, transistors 408 and 410 will both be turned off thereby providing no output signal on the composite malfunction line 412 thereby shutting off transistor 420 and transistor 428 so that the contactor drive will disconnect any circuits to which it is coupled. In such an event, the malfunction lights will indicate the cause of failure but in that case the alarm level lights 386 and 404 being non-illuminated, will indicate that the source of the shutdown has been a malfunction rather than a high gas concentration.

While the particular invention and two specific embodiments thereof have been shown and described herein, it will be obvious to persons skilled in the art that other embodiments or changes or modifications might be made herein without departing from this invention in its broader aspects, and it is the aim to include herein all such modifications and equivalents as fall within the true scope of this invention.

What is claimed is:

1. A system for detecting combustible gases comprising:

electrical circuit means defining a plurality of discrete channels, the circuit means of each channel including sensing means of the type exhibiting a change in the electrical resistance thereof when exposed to a combustible mixture of gas and air, source means coupled to each said sensing means for supplying constant current thereto, bridge circuit means coupled between said source means and said sensing means, said bridge circuits each having an output;

signal conditioning means coupled to the output of each of said bridge circuits for adjusting the output signals thereof;

channel selection means having the inputs thereof coupled to each of said channels, said selection means including means responsive to the magnitude of the input signals to provide as an output signal the input signal of the greatest magnitude;

indicator means coupled to the output of said selection means to indicate detected gas concentration levels, control means coupled to said indicator means for providing an external control signal responsive to the selected output signal from said channel selection means; and malfunction detecting means coupled to each of said current source means, said detecting means being responsive to a failure of current flow between said source means and the respective sensor means coupled thereto to provide an output signal, the output of said malfunction detecting means being coupled to said channel selection means, said malfunction detecting means being thereby operative to actuate said channel selection means to cause an output signal therefrom to said control means as long as any one of said discrete channels provides an output signal.

2. The system set forth in claim 1 wherein said indicator means comprises an analog means for providing a quantitative indication of the relative magnitude of the selected channel signal.

3. The system set forth in claim 2 wherein said indicator means further includes level detecting means, said level detecting means including means for selectively adjusting one or more threshold levels thereof, said level detecting means providing output signals in response to said selected channel signal of the greatest magnitude.

4. The system set forth in claim 1 wherein said malfunction detecting means further includes indicator means for indicating the occurrence and source of said malfunction output signal.

5. The system set forth in claim 1 wherein said channel selection means comprises amplifier means coupled to each output of said bridge circuits, each amplifier means having an output coupled to a common junction, means coupled to each of said amplifier means for comparing the magnitudes of the outputs thereof and for selectively coupling to said junction only the one of said amplifier means whose output signal is the greatest.

6. The system set forth in claim 1 wherein said channel selection means comprises amplifier means coupled to each output of said bridge circuits, each amplifier having the output thereof coupled to a common junction, comparator means having the inputs thereof coupled to the outputs of said amplifier means, switch means coupled to the outputs of said amplifier means and said comparator means, said comparator means operative to respond to the one amplifier signal thereto which is greatest in magnitude to activate said switch means to couple only said greatest amplifier signal to said junction.

7. The system set forth in claim 6 further including time delay means having an input coupled to said current source means, the output of said delay means being coupled to said indicator means, said delay means being responsive to said source when power is first applied to disable said indicator means for a predetermined period of time.

8. The system set forth in claim 3 further including visual indicator means coupled to said channel selection means for indicating which of said channel signals is coupled to said junction.

9. The system set forth in claim 3 further including visual indicator means coupled to said level detecting means for indicating the condition when one or more of said threshold levels has been exceeded.

10. The system set forth in claim 3 wherein said level detecting means comprises:

first and second outputs, first and second drive means coupled to said outputs, indicator means coupled to each of said drive means, first and second adjusting means coupled to said level detecting means, said first adjusting means for adjusting said first output to a preselected low alarm level, said second adjusting means for adjusting said second output to a preselected high alarm level, each of said indicator means having control means for coupling the output thereof to a remote location.

11. The system set forth in claim 1 wherein said channel selection means comprises:

differential amplifier means coupled to each output of said bridge circuits, a diode coupled in series with the output of said amplifier, feedback resistance coupled between an input of said amplifier and through said series diode to the amplifier output thereby providing an ideal diode characteristic, said amplifier outputs being coupled together to a common junction from a point intermediate said diode and said feedback resistance.

12. The system set forth in claim 11 further including switch means coupled in series between each amplifier output and said common junction, said switch means being operatively coupled to said malfunction detecting means.

* * * * *